United States Patent [19]

Zwirn et al.

[11] Patent Number: 4,876,602
[45] Date of Patent: Oct. 24, 1989

[54] ELECTRONIC FOCUS CORRECTION BY SIGNAL CONVOLUTION

[75] Inventors: Robert Zwirn, Los Angeles; Gerard L. Rafanelli, Fountain Valley, both of Calif.

[73] Assignee: Hughes Aircraft Company, Los Angeles, Calif.

[21] Appl. No.: 189,073

[22] Filed: May 2, 1988

[51] Int. Cl.$^4$ .............................................. H04N 5/208
[52] U.S. Cl. ..................................... 358/227; 358/162
[58] Field of Search ........... 358/227, 163, 167, 213.17, 358/345, 162; 354/403; 250/205

[56] References Cited

U.S. PATENT DOCUMENTS

| | | | |
|---|---|---|---|
| 4,343,021 | 8/1982 | Frame | 358/163 |
| 4,623,237 | 11/1986 | Kaneda et al. | 358/227 |
| 4,661,692 | 4/1987 | Kawaski | 250/205 |
| 4,740,678 | 4/1988 | Horikawa | 354/403 |
| 4,754,334 | 1/1987 | Kriz et al. | 358/345 |

Primary Examiner—Jin F. Ng
Assistant Examiner—Stephen Brinich
Attorney, Agent, or Firm—William J. Streeter; Kenneth J. Powell; Wanda Denson-Low

[57] ABSTRACT

An electronic focus correction system is provided. The invention (10) is adapted to correct focus aberrations in an electronic imaging system which provides electrical signals representative of a scene of image data. The invention includes a memory (12) for providing sets of weighting coefficients and a two dimensional convolver (18) for multiplying the input electrical signals corresponding to a window in and around each pixel of image data by a set of the weighting coefficients. The two dimensional convolved (18) assigns to each pixel a value equal to the sum of the products of the coefficients times the electrical signals within each window to provide a plurality of weighted output signals. The output signals constitute a corrected image. A controller (20), responsive to the output of the two dimensional convolver (18), is provided to measure the figure of merit for the corrected image. Coefficient control logic (108) responsive to the output of the controller (20) is included for providing signals to select an alternate set of coefficients for multiplication with the input signals to thereby provide a corrected image with an optimized figure of merit. In a more specific embodiment, model adjustment logic (112) is included for changing the power spectral density of the corrected image.

21 Claims, 6 Drawing Sheets

ELECTRONIC FOCUS CORRECTION BY SIGNAL CONVOLUTION

BACKGROUND OF THE INVENTION

1. Field of the Invention

The present invention relates to electronic imaging systems. More specifically, the present invention relates to techniques and systems for correcting focus aberrations in electronic imaging systems which may be electro-optical.

While the present invention is described herein with reference to a particular embodiment for a particular application, it is understood that the invention is not limited thereto. Those having ordinary skill in the art and access to the teachings of this invention will recognize additional modifications, applications and embodiments within the scope thereof.

2. Description of the Related Art

Focus aberrations in electro-optical systems may be due to variations in the range of objects in a target scene or to fluctuations in the temperature of the sensing elements. Additional aberrations may result from defects in system optics or defects in the processing circuitry. Focus correction may be particularly problematic when the aberration is due to range variations as the effect of focus may not be uniform over a subject frame.

Conventional techniques for correcting focus usually involve open and closed loop electro-mechanical servo control systems which move an optical element, typically a lens, in response to an error signal. Passive and active thermal compensators, for example, move an optical element as a function of temperature. Unfortunately, since these systems are typically open loop, there is often some residual error and there is no provision for range compensation. On the other hand, closed loop autofocus systems minimize focus errors regardless of cause. These systems move an optical element in response to a feedback error signal. Since a single setting is applied to the whole scene, there is no correction for intra-scene range variation effects. Also, a residual diffraction blur typically remains.

Further, these electro-mechanical servo control systems add to the weight, cost and power requirements of electro-optical systems and tend to complicate the design.

There is therefore a need in the art for a system or technique for electronically correcting the focus of electro-optical systems for aberrations due to temperature fluctuations, range variations, diffraction and other effects. Ideally, the system would be noninvasive, allowing for an inexpensive retrofit of existing systems.

SUMMARY OF THE INVENTION

The need in the art is addressed by the electronic focus correction system of the present invention. The invention is adapted to correct focus aberrations in an electro-optical system which provides electrical signals representative of a scene of image data. The invention includes first means for providing sets of weighting coefficients and second means for multiplying the input electrical signals corresponding to a window around each pixel of image data by a set of the weighting coefficients. The second means assign to each output pixel a value equal to the sum of the products of the coefficients times the electrical signals within each window to provide a sequence of weighted output signals. The output signals constitute a corrected image. Third means responsive to the output of the second means are provided to measure the figure of merit for the corrected image. Fourth means responsive to the output of the third means are included for providing control signals to select an alternate set of coefficients for multiplication and accumulation with the input signals to thereby provide a corrected image with an optimized figure of merit. In a more specific embodiment, model adjustment means are included for changing the power spectral density of the model image.

BRIEF DESCRIPTION OF THE DRAWINGS

FIG. 3($a$) shows the timing diagrams used to illustrate the generation of a window by the window generator of the present invention.

FIG. 3($b$) shows an illustrative implementation of the window generator of the present invention.

FIGS. 5($a$), ($b$) and ($c$) show a point in an ideally focused image, the corresponding two dimensional ideal point spread function, and the corresponding sampled detector output of an image respectively.

FIGS. 6($a$), ($b$) and ($c$) show a point in a real image with some defocus aberration, the corresponding one dimensional point spread function, and the corresponding sampled detector output of the image respectively.

FIGS. 7($a$) and 7($b$) show a two dimensional point spread function of an ideal image and the corresponding detector output respectively.

FIGS. 8($a$) and 8($b$) show a two dimensional point spread function of a real image having some defocus blur and the corresponding detector output respectively.

FIG. 9($a$) is a one dimensional point spread function B of a point in a real image with some defocus aberration due to blur plus diffraction effects.

FIG. 9($b$) is the one dimensional point spread function of FIG. 9($a$) inverted to represent −B.

FIG. 9($c$) is representative of the function 2−B which is provided by the masks of the present invention.

FIG. 9($d$) is representative of the corrected video output provided by the convolution of input video data with a 2−B mask as taught by the present invention.

FIG. 10 is a two dimensional representation of a typical mask used in the present invention.

DESCRIPTION OF THE INVENTION

The present invention provides a noninvasive system and technique for electronic correction of focus aberrations in electro-optical systems. As described more fully below, input image data in a window around each pixel is multiplied by a set of weighting coefficients to provide a number of products. The products for each window are accumulated and the sum is assigned to the center pixel. In this manner, the entire image is replaced by an array of weighted sums. This array constitutes the corrected video signal. A focus discriminator measures the figure of merit for the corrected image and provides control signals for the selection of the subsequent set of coefficients for multiplication with the input data. The process is continued to achieve an optimally focused image.

Figure 1:
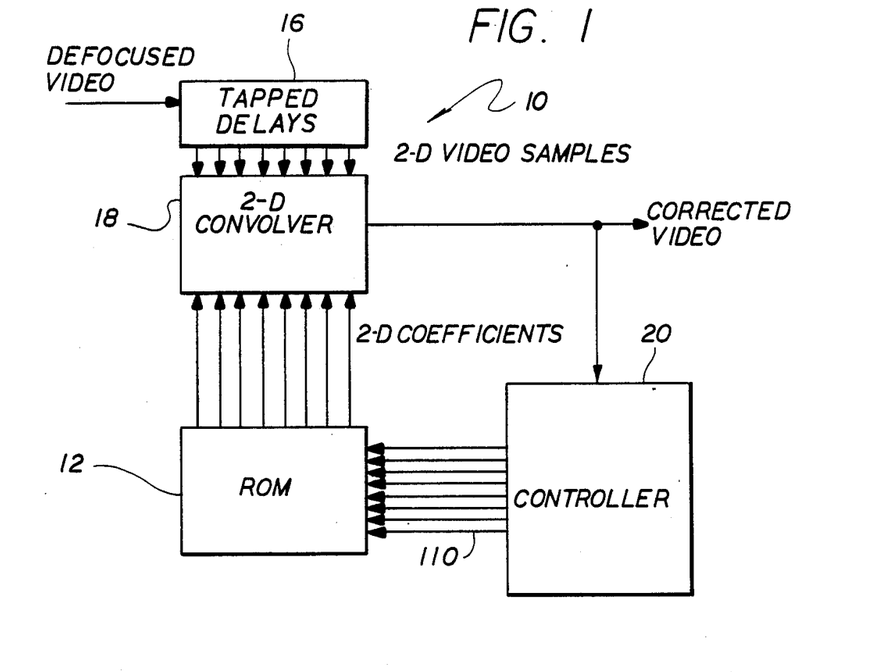
FIG. 1 is a block diagram of an illustrative embodiment of the electronic focus correction system of the present invention.

FIG. 1 shows a block diagram of an illustrative implementation of the electronic focus correction system of the present invention. The invention 10 includes a read only memory (ROM) 12 in which a plurality of sets of weighting coefficients are stored. Each set of coefficients provides a convolution mask or simply a mask. The manner in which the coefficients may be generated is described more fully below. Electrical signals corresponding to defocused input image data are received from a conventional electro-optical system (not shown) and stored in a tapped delay line 16. The delay line provides input data around each consecutive pixel of data signals for multiplication with the weighted coefficients. The delay line 16 may be implemented as a charge coupled device (CCD), a random access memory (RAM) or by other suitable memory means as is known in the art. The delay line 16 should be large enough to store sufficient data to provide a domain that includes substantially all of the information for the largest anticipated point spread function for the input image.

A convolver 18 provides means for multiplying the input data by a set of weighting coefficients provided by the ROM 12. (The convolver may be implemented digitally, or with special purpose convolver chips such as the TRW TDC1028, or with CCD transversal filters which have voltage controlled taps such as the CRC 141 or in any alternative manner known in the art.) The convolver 18 multiplies signals in a window around each pixel of input data by a corresponding coefficient in the set provided by the ROM 12. The resulting products are summed and stored as a weighted sum at the location of the pixel. Thus, a sequence of weighted sums is provided which constitutes a corrected video image. This data is the system output and is fedback to a controller 20.

Figure 2:
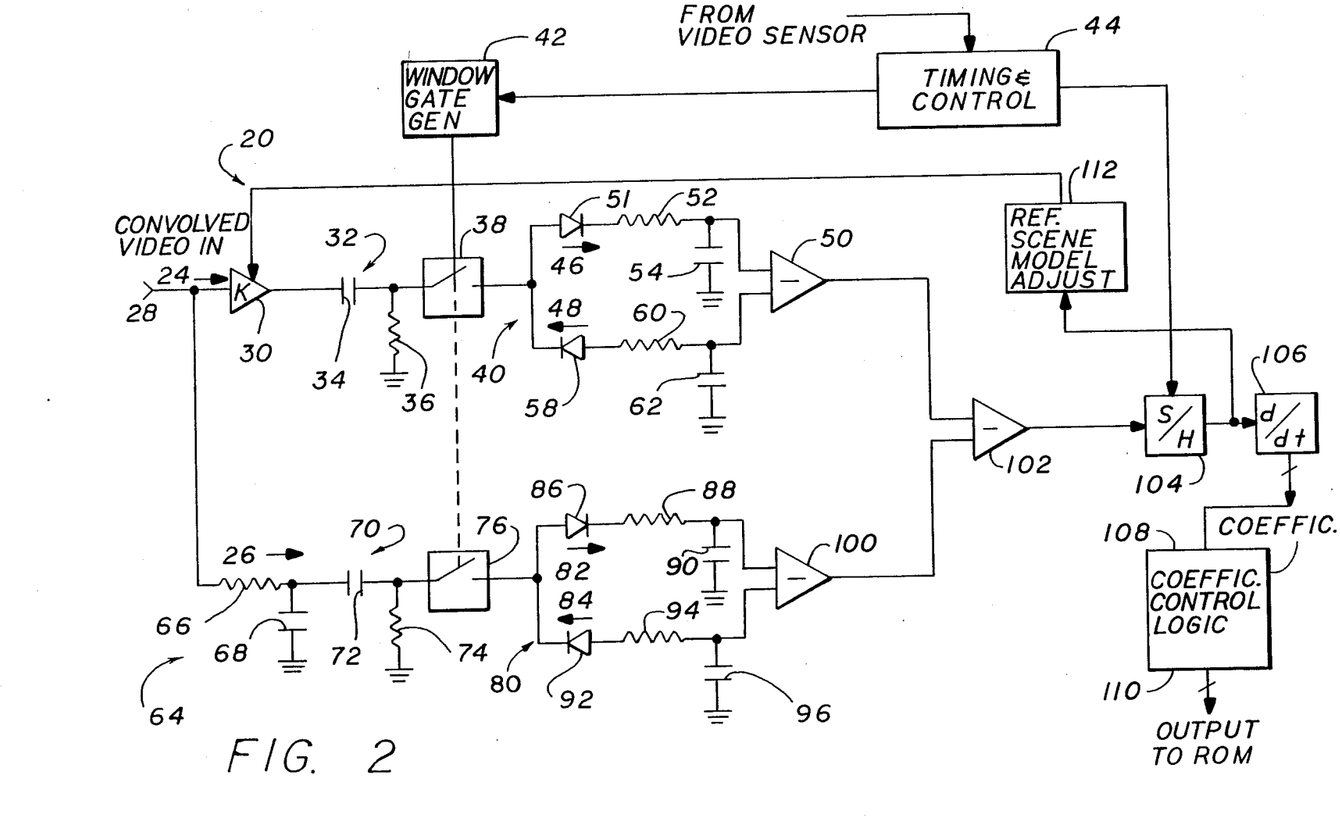
FIG. 2 is a block diagram of an illustrative embodiment of the focus discriminator of the present invention.

The controller 20 measures the figure of merit of the corrected video image and provides control signals to select alternate sets of coefficients for multiplication with the input data to optimize the focus of the output video. FIG. 2 shows an illustrative implementation of the controller 20. It includes a focus discriminator, coefficient control logic, scene model adjustment logic, a window gate generator, and timing and control logic. The focus discriminator includes a signal channel 24 and a reference channel 26 which are connected to an input terminal 28 by which corrected or convolved video is provided to the controller 20. Focus discrimination is performed by conditionally integrating video which has been filtered to enhance the high frequency components of a scene with respect to the low frequency components. The low frequency components are measured in the reference channel 26 and used to modify the high frequency components in the signal channel 24.

The signal channel 24 includes a variable gain amplifier 30, a high pass filter 32, an electronic switch 38, and a conditional integrator 40. Modification of the video is accomplished in a bandpass amplifier provided by the variable gain amplifier 30 and high pass filter 32. The gain of the variable amplifier 30 equalizes the output of the conditional integrator of the signal channel 24 with that of the reference channel 26. The gain of the amplifier 30 also affects the power spectral density of the corrected video image by adjusting the reference scene model power spectral density as discussed more fully below. The high pass filter 32 includes a capacitor 34 and a resistor 36. The high pass filter 32 is a single pole high pass filter which has the characteristic that attenuation is inversely proportional to frequency. It is effectively a weighting factor which favors higher relative frequencies over lower frequencies while eliminating none. This is in contrast to the high-Q filter approaches which require scene information in specific frequency regions. The time constant of the filter 32 is chosen to roll-on just below that frequency which the video would be limited to by the effects of the worst blur.

The output of the high pass filter 32 is gated to the conditional integrator 40 by an electronic switch 38. The switch 38 operates under control of a window gate generator 42 which in turn is controlled by a timing and control circuit 44. The window gate generator 42 thereby provides selective gating of the filtered video to the conditional integrator 40. The window gate generator 42 and the timing and control circuit 44 provide a window within which a figure of merit is measured.

Figure 3A:
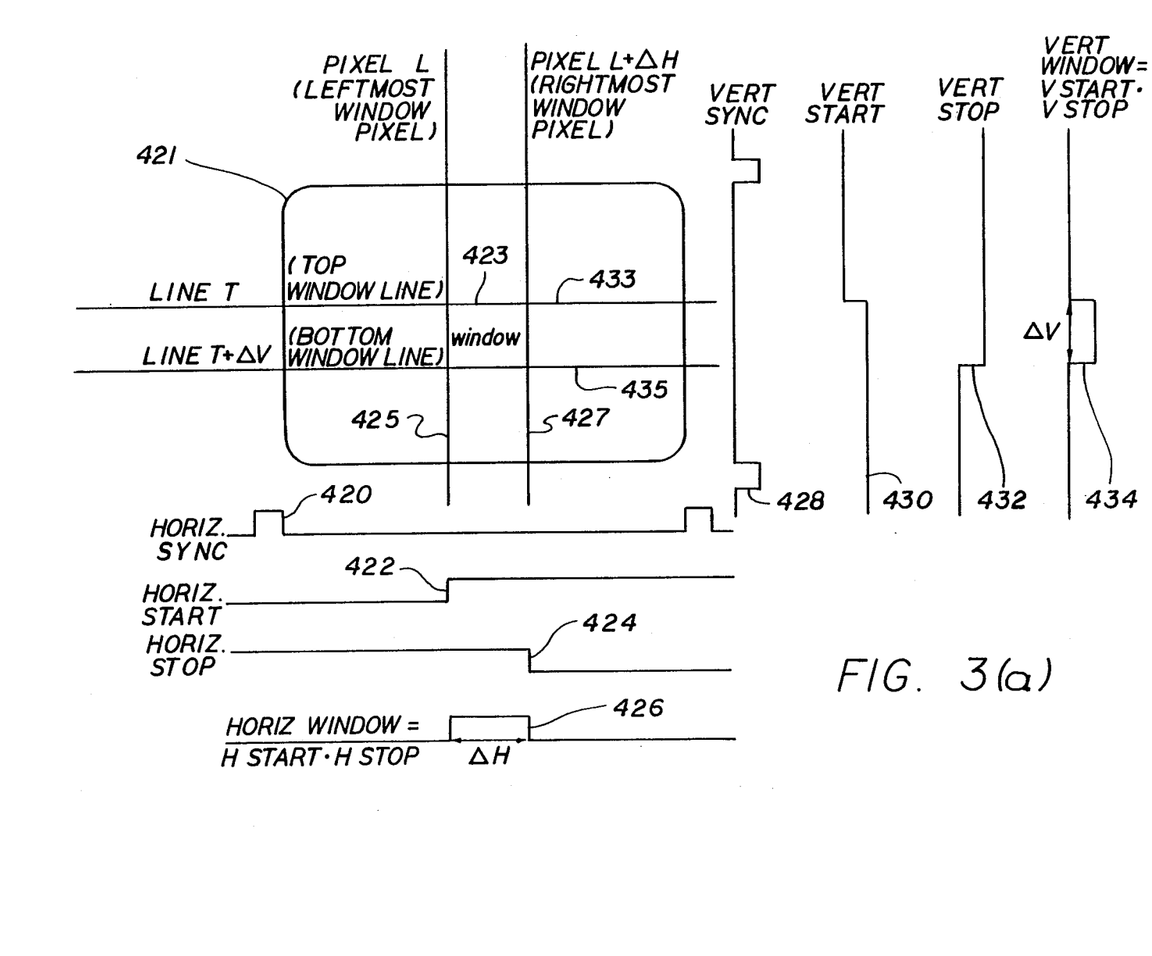
Figure 3B:
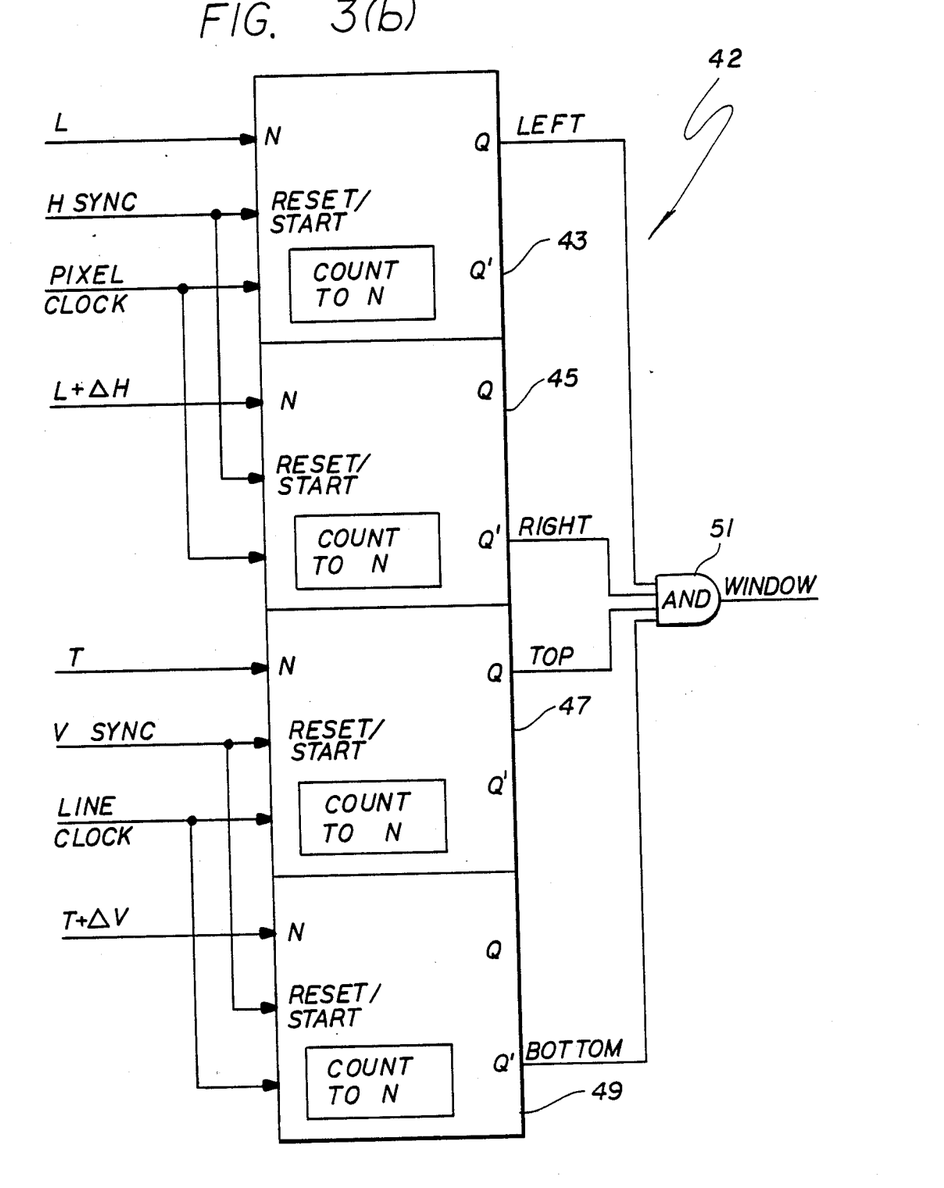

As shown in FIGS. 3(a) and 3(b), for each input image, the window generator 42 utilizes a horizontal sync pulse 420, a start pulse 422, and a stop pulse 424 to provide a horizontal window pulse 426. That is, the horizontal window pulse 426 is the union of the start and stop pulses 422 and 424 respectively. Similarly, the vertical window pulse 434 is generated by the union of the vertical start pulse 430 and the vertical stop pulse 432. Thus, within a field of data 421 formed by the horizontal and vertical sync pulses 420 and 428 respectively, a window 423 is created. The leading edge of the vertical window pulse 434 defines a top window line T and the trailing edge defines a bottom window line T+delta V, where delta V is the duration of the vertical window pulse 434. The window 423 is defined by the leftmost window pixel L, at the leading edge of the horizontal window pulse 426, and the rightmost window pixel L+delta H, at the trailing edge of the horizontal pulse 426. Delta H is the duration of the horizontal pulse 426.

An illustrative implementation of the window generator 42 is shown in FIG. 3(b). The window generator 42 includes four Count to N counters 43, 45, 47, and 49 which count up to a preset value provided at the N inputs thereto. Counters 43 and 45 provide the leading and trailing edges of the horizontal window pulse 426, respectively, and counters 47 and 49 provide the leading and trailing edges of the vertical window pulse 434. Each counter is reset and started by a sync pulse. The counters count up to a value N which is the address for the pixel L for the first counter 43, pixel L+delta H for second counter 45, line T for the third counter 47, and line T+delta V for the fourth counter 49. The first and second counters 43 and 45 count pulses from the pixel clock while the third and fourth counters 47 and 49 count pulses from the line clock. Thus, when the horizontal sync pulse is received, the first counter 43 counts pixel clock pulses until the count equals the value of the leftmost window address provided at the N input by line L. The normally low Q output goes high providing the leading edge 425 of the horizontal window pulse 426. At this time, the normally high Q' output of the second counter 45 is also high. When the same set of conditions exist between the third and fourth counters 47 and 49, 10 the output of the AND gate 51 goes high until the second or fourth counter 45 or 49 reaches the terminal count of L+delta H or T+delta V respectively. When this occurs, the Q output goes high or the $\bar{Q}$ output goes low. Until this occurs, the horizontal and vertical pulses 426, 15 and 434 continue to be present, the output of the AND gate 51 is high and the window pulse is applied to switches 38 and 76.

The inputs to the window generator 42 are provided by the timing and control circuit 44. The timing and control circuit 44 may be subject to various implementations as is known in the art. Any implementation must provide the line and pixel clocks for the counters of the window gate generator 42.

The conditional integrator 40 may be implemented digitally as is known in the art. It is shown in FIG. 2 in an analog implementation for the purpose of illustration. The conditional integrator 40 includes a first path 46, a second path 48 and a differential amplifier 50. The first path 46 includes a diode 51, a resistor 52 and a capacitor 54. The second path 48 includes a second diode 58 connected to allow current flow in a direction opposite to that of the first diode 51. A resistor 60 and a capacitor 62 complete the second capacitor 54 and the second capacitor 62 are reset by the timing and control circuit 44 (via connections not shown) to provide a reset for the conditional integrator 40 as is known in the art.

In each path, the diode and the capacitor combine to provide the benefits of a peak detector. The resistor combines with the capacitor to provide the benefits of an integrator/low pass filter which mitigates the effect of noise on the power measurement. (It should be noted that the present invention actually derives a figure of merit in the signal path and compares it to the figure in the reference path. The spectral power and the figure of merit are not actually "measured" per se. Therefore the output is not a signal which represents these measurements. It is a derived function of the signal.) Assume for example, a positive current flow in the upper path 46 which turns on diode 51. As long as the signal exceeds the stored capacitor voltage in amplitude, the output of the integrator (provided by the resistor 52 and the capacitor 54) will increase and the output of the conditional integrator 40 will increase. When the signal diminishes sufficiently in amplitude, the stored capacitor voltage turns off the diode 51 and the path is opened. As the current flow increases in the negative direction thru the second path 48, the output of the amplifier 50 will again increase because of the connection to the negative terminal of the differential amplifier 50. The output of the conditional integrator will follow the output of the second integrator, formed by the resistor 60 and the capacitor 62, until a peak is reached. (The resistors 52 and 60 and the capacitors 54 and 62 are chosen so that the RC time constant of the first and second integrators is on the order of the spatially smallest object anticipated in a scene.) Thus, both transitions of an analog input signal are integrated to provide a measure of the high frequency components of a frame of input data viz., the input scene.

The reference channel 26 is substantially identical to the signal channel 24. It differs in that the variable gain amplifier 30 is replaced by a low pass filter 64 consisting of a resistor 66 and a capacitor 68. The low pass filter 64, with the high pass filter 70, provides a bandpass filter which rejects the high frequency components of the input data. This band pass filter drives the conditional integrator 80 of the reference channel 26. It will be evident then that since the reference channel 26 is otherwise identical to the signal channel 24, it operates in the same manner to provide a measure of the low frequency components of the scene. That is, the reference channel 26 is gated by the switch 76 to look at the data in the same window as the signal channel 24. As shown in FIG. 2, the conditional integrator 80 of the reference channel 26 includes a first path 82 and a second path 84. The first path includes a diode 86, a resistor 88 and a capacitor 90 connected as shown in FIG. 2. The second path 84 includes a diode 92, a resistor 94 and a capacitor 96. The first and second paths 82 and 84 terminate in the input terminals of a second differential amplifier 100. The integrators of the first and second paths are reset in the same manner as the integrators of the signal channel conditional integrator 40.

The high frequency components provide a measure of the quality of the focus of the output image. Thus, the first differential amplifier 50 provides an input to a third differential amplifier 102 which represents the higher frequency components of a scene and the second differential amplifier 100 provides a second input to the third differential amplifier 102 which represents the lower frequency components of a scene. The third differential amplifier 102 performs the function of comparing representation of the higher frequency components in a scene to the lower (reference) frequency components of the scene. That is, its output represents the weighted difference in the representations of strength of the two frequency components. A sample and hold circuit 104 presents successive samples of this output to a differentiator 106 under command of the timing and control circuit 44. The differentiator 106 provides an indication of whether the weighted power in the higher frequency components is increasing or decreasing relative to that in the lower frequency components. That is, it provides an indication of the focus of system and how it is improving or deteriorating. This data is utilized by the coefficient control logic 108 to select another set of coefficients from the ROM 12.

As discussed more fully below, each set of coefficients is configured to correct a particular known blur due to focus variations plus diffraction. These coefficients are stored in the ROM 12 in a manner known in the art. The coefficient control logic 108 places addresses on the bus 110 to select adjacent sets of coefficients for the convolver 18. The coefficient control logic 108 has an address pointer which steps up or down and reverses direction whenever the output of the differentiator goes negative. The controller 20 includes scene model adjustment logic 112 which examines the output of the differential amplifier at the sample and hold circuit 104. Effectively, it seeks to minimize the peak-to-peak excursions of the output of the differential amplifier 102. By adjusting the gain of the amplifier 30, in effect, the scene model adjustment logic controls the model power distribution function discussed below.

While the weighting coefficients stored in the ROM 12 may be generated by calculation, in the best mode, these coefficients are derived experimentally. For example, the optical system (not shown) is pointed at a known object (i.e. a point source) with a given amount of image blur. The blur is the system point spread function which is used to construct the mask coefficients which are stored. Next, the amount of blur is increased or decreased and another set of coefficients are stored. This process continues until a set of coefficients is generated for each blur condition. It should be noted that this is believed to be the best mode in that the effects of diffraction blur are included based on empirical data. This is believed to be more accurate than values resulting from idealized calculations of diffraction blur effects.

Figure 4:
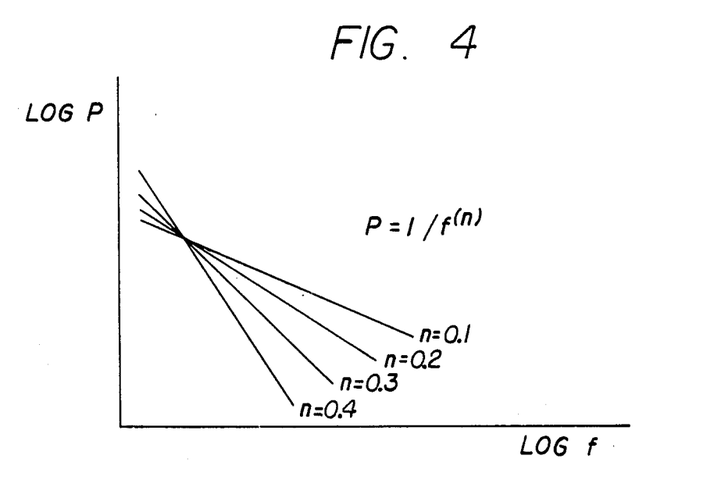
FIG. 4 shows a number of curves each representing the power spectral density function P of a scene where the parameter n varies from scene to scene.

Whether the blur data is generated experimentally or by calculation, the weighting coefficients are calculated, based on the blur data, to produce an output image, as a result of the convolution with the input data, which has a power spectral density which is sufficiently close to an ideal or chosen functional relationship. FIG. 4 shows a number of curves representing the power spectral density function P of a scene for various values of a parameter n. The function obeys equation 1 below:

$$P = 1/f^n \quad [1]$$

where P is the power spectral density function, f is the frequency, and n controls the slope. The power spectral density function is a straight line because the log of the power is graphed in FIG. 4 against the log of the frequency. While it is believed that the coefficients may be chosen to realize any power spectral density function, it is believed that one such function may be chosen which represents the power distribution of an ideally focused image of the current scene.

The coefficients must next be generated to achieve the desired power spectral density function. In the present invention, the coefficients are generated and stored to create a mask that has a spatial intensity distribution function of the form of (2−B), where B is the spatial intensity distribution of blur data for the system corresponding to a given amount of blur. A separate mask is stored for each amount of blur. As mentioned above, successive masks are tried automatically in the vicinity of the masks that provide an optimum figure of merit to validate optimality. Hypothetical masks (sets of weighting coefficients) are stored to allow for excursions past an optimum mask that would otherwise be the last mask so that the fact that it is the optimum mask may be confirmed. Thus, the system constantly seeks the optimum solution. It should be noted that these trials about the optimum focus with alternate sets of coefficients would have an imperceptible effect on the image to the naked eye.

Figure 5:
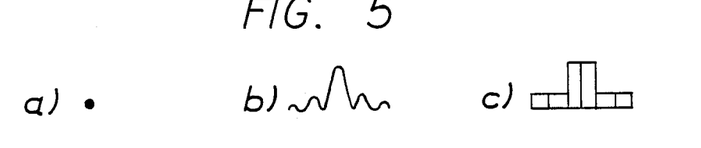
Figure 6:
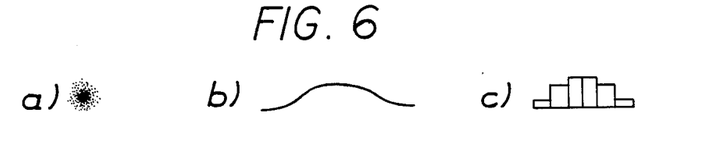
Figure 7A:
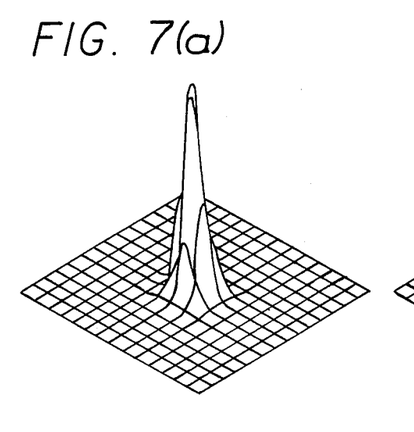
Figure 7B:
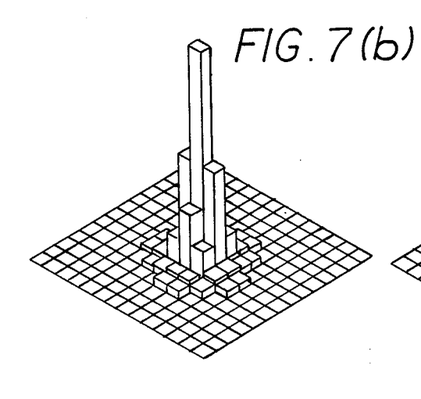
Figure 8A:
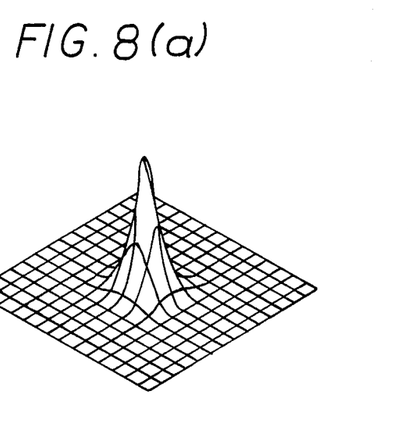
Figure 8B:
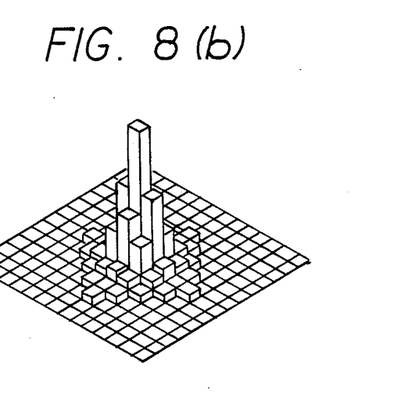

FIGS. 5(a), (b) and (c) show a point in an ideally focused image, the corresponding one dimensional ideal point spread function, and the corresponding sampled output of an image detector respectively. FIGS. 6(a), (b) and (c) show a point in a real image with some defocus aberration due to blur, the corresponding one dimensional point spread function, and the corresponding sampled output of the image detector respectively. The effect of the defocus blur is to smear the point spread function and the output of the detector. The present invention returns the energy to the center of the spatial intensity distribution function and thereby approximates a well focused image. FIGS. 7(a) and 7(b) show a two dimensional point spread function or spatial intensity distribution of an ideal image and the corresponding detector output respectively. FIGS. 8(a) and 8(b) show a two dimensional point spread function of a real image having some defocus blur and the corresponding detector output respectively.

Figure 9A:
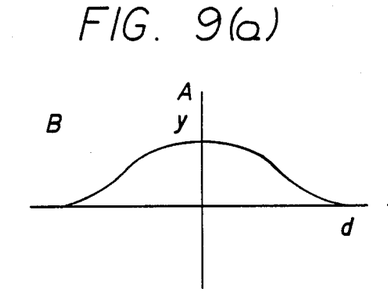
Figure 9B:
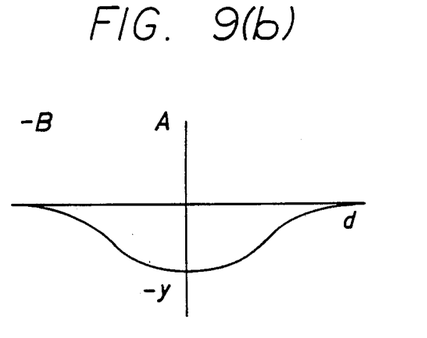
Figures 9C, 9D, 10:
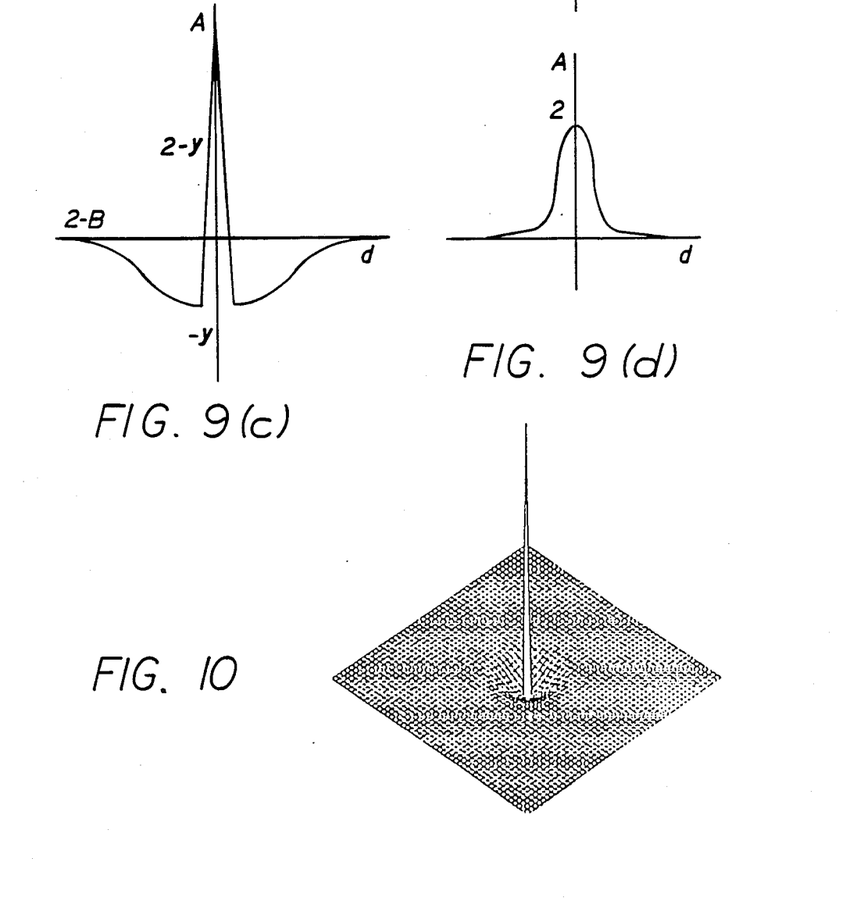

The operation of the present invention can now be explained with reference to the one dimensional spatial intensity distribution of FIG. 6(b) which is duplicated in FIG. 9(a). The present invention operates on the assumption that the defocused spatial intensity distribution represents the blur effects on the image and assigns it the variable B. Thus, the function (−B) is represented in FIG. 9(b). The coefficients are weighted to generate −B and so that the sum of the weights is −1. In addition, the coefficients are weighted to add a central impulse of 2 to the function −B so that a mask similar to that of FIG. 9(c) is created. When this mask is convolved with the input data (FIG. 9(a)) in the convolver 18, the effects of the blur are effectively suppressed and output data is provided which approximates the spatial intensity distribution function shown in FIG. 9(d). That is, the blurred input data and the 2−B mask deconvolve out most of the blur, yielding the distribution of FIG. 9(d).

Figure 11:
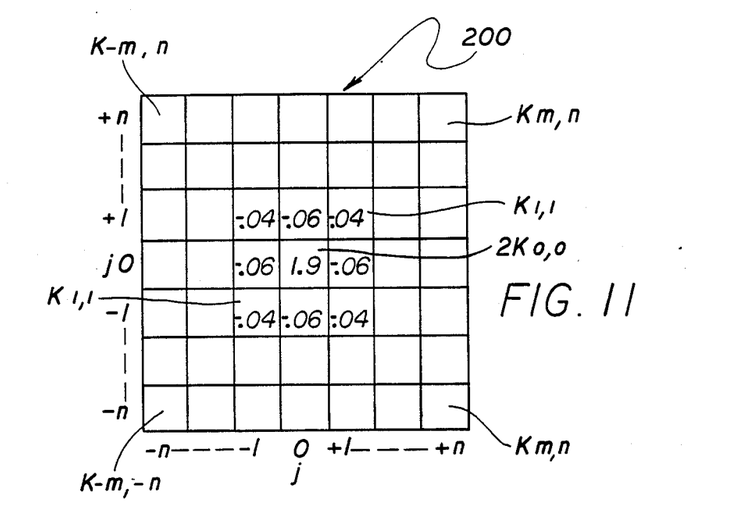
FIG. 11 shows a two dimensional topological representation of a typical mask.
Figure 12:
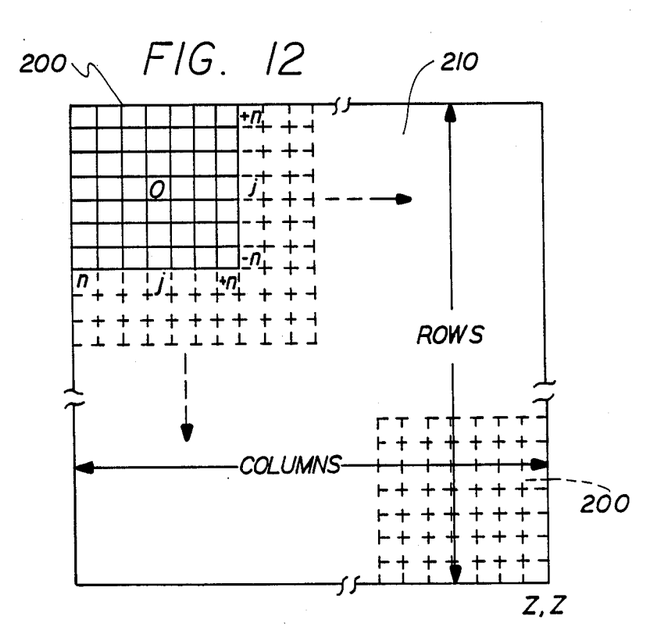
FIG. 12 shows the two dimensional topologically represented mask overlaying a frame of video data.

A thee dimensional representation of a typical mask is shown in FIG. 10. A two dimensional topological representation of a mask 200 is shown in FIG. 11. FIG. 12 shows how the mask 200 is superimposed on a frame of image data 210 by the convolver 18 to produce a plurality of products of the mask times the sampled image values. The entire mask 200 is centered on each ij pixel of the image. A product is created for each image data sample and its superimposed coefficient in the set or mask. All of the products within the window (which coincides with the mask) are then summed in the convolver 18 and assigned to the center pixel at say 0,0. Next, the window moves to pixel 0,1, applies the convolution mask and assigns the resultant sum of the products value to pixel 0,1. Ultimately the mask is applied to the last pixel in the frame, pixel z,z. This is represented in phantom in FIG. 12. In this manner, an entire output image frame is created where each pixel is composed of an array of sums of products. The figure of merit is then measured as discussed above.

The process is repeated except that an adjacent alternate set of coefficients, that is, the mask corresponding to the next amount of blur, is selected and applied to the subsequent field of data. Some amount of hunting is usually required before the best mask is tried. So the controller 20 continues to point to different addresses in the ROM 18 for each video field until the output of the differentiator goes negative. The pointer then reverses direction until the output goes negative again, at which time it reverses again and so on. The pointer continues to make excursions in both directions from optimum focus until the image changes due to additional defocus, due to changes in scene content, or due to significant changes in range.

The array of accumulated sums, mentioned above, is the corrected video image and is the system output. This appears at the output of the convolver 18. The system 10 thus provides a filter for which the term "Zwirn filter" is coined.

Thus the present invention has been described with reference to an illustrative embodiment for a particular application. Those of ordinary skill in the art will recognize additional modification, applications, and embodiments within the scope of the invention. For example, the system is not limited to an analog implementation. Nor is the invention limited to any particular means for storing data, convolving data, or providing a measurement of the figure of merit of the corrected image or to any particular type of imaging system. The invention is similarly not limited to any model power spectral density function nor the weighting of the masks to achieve same. Finally, the invention is not limited to the means by which the masks are created.

It is intended by the appended claims to cover any and all such modifications, applications and embodiments.

Accordingly,

What is claimed is:

1. An electronic focus correction system for correcting focus aberrations in an electro-optical system having means for providing electrical signals representative of a scene of image data, said electronic focus correction system comprising:
   first means for providing plural sets of weighting coefficients;
   second means for multiplying the electrical signals corresponding to a window around each pixel of image data by a set of said weighting coefficients and for assigning to each pixel a weighted signal equal to the sum of the products of the coefficients times the electrical signals within the window to provide one of a plurality of weighted sequential output signals which constitute a corrected image;
   third means responsive to the output of said second means for measuring a figure of merit of said output image; and
   fourth means operatively connected to said third means for selectively providing control signals, in response to said measured figure of merit, to change said plurality of weighted coefficients to thereby optimize said figure of merit.

2. The electronic focus correction system of claim 1 wherein said first means includes first storage means for storing said weighting coefficients.

3. The electronic focus correction system of claim 2 wherein said second means for multiplying the electrical signals corresponding to a window around each pixel of image data by a plurality of weighting coefficients includes second storage means for storing said electrical signals to form said window.

4. The electronic focus correction system of claim 3 wherein said second means for multiplying the electrical signals corresponding to a window around each pixel of image data by a plurality of weighting coefficients includes means for convolving said stored electrical signals by said weighting coefficients.

5. The electronic focus correction system of claim 1 wherein said third means includes model adjustment means responsive to the measured figure of merit thereof for changing a power spectral density of the corrected image.

6. The electronic focus correction system of claim 1 wherein said third means includes a focus discriminator operatively connected to the output thereof for measuring the figure of merit of said output image.

7. The electronic focus correction system of claim 6 wherein said focus discriminator includes first and second channels connected to the input thereof, said first channel including a first filter, connected to said input and having a first passband, and a first conditional integrator connected to said first filter.

8. The electronic focus correction system of claim 7 wherein said second channel of said focus discriminator includes a second filter, connected to said input and having a second passband, and a second conditional integrator connected to said second filter.

9. The electronic focus correction system of claim 8 wherein said first and second conditional integrators include peak logic as part of said conditional integrators.

10. The electronic focus correction system of claim 9 wherein said first and second conditional integrators include an integrator operatively connected to said peak logic.

11. The electronic focus correction system of claim 8 wherein said focus discriminator includes a differential amplifier for generating an error signal in response to the outputs of said first and second conditional integrators.

12. The electronic focus correction system of claim 8 wherein said focus discriminator further includes means for differentiating the output of said differential amplifier.

13. The electronic focus correction system of claim 7 wherein said first filter is a band pass filter.

14. The electronic focus correction system of claim 8 wherein said second filter is a band pass filter.

15. The electronic focus correction system of claim 12 wherein said means for differentiating the output of said differential amplifier includes a sample and hold circuit connected between said differential amplifier and a differentiator.

16. The electronic focus correction system of claim 1 wherein said fourth means includes coefficient control logic for generating said control signals in response to the measured figure of merit of said corrected image.

17. The electronic focus correction system of claim 15 wherein said third means includes model adjustment means responsive to the measured figure of merit thereof for changing a power spectral density of the corrected image in response to the output of said sample and hold circuit.

18. The electronic focus correction system of claim 17 wherein said model adjustment means includes a variable gain amplifier connected within one of the two channels and means for adjusting the gain of said amplifier in response to peak to peak excursions of said measured figure of merit.

19. A method for correcting aberrations in the focus of an image generated by an electro-optical system including the steps of:
   (a) providing a set of weighting coefficients;
   (b) multiplying a plurality of video sample signals representative of a window around a pixel in the center of said window by said a set of said weighting coefficients to generate a plurality of products;
   (c) accumulating said products and assigning the sum thereof to said center pixel;
   (d) continuously selecting successive center pixels and performing steps (b) and (c) until an array of accumulated sums is generated which is representative of an entire field of video information.

20. The method of claim 19 wherein said step (a) further includes the step of: providing a plurality of sets of weighting coefficients.

21. The method of claim 20 further including the steps of:
   (e) measuring a figure of merit for said image corresponding to a selected set of weighting coefficients;
   (f) selecting alternate sets of weighting coefficients based on said measurement; and
   (g) repeating steps (b) thru (f) to optimize the figure of merit for said image.

* * * * *

UNITED STATES PATENT AND TRADEMARK OFFICE
CERTIFICATE OF CORRECTION

PATENT NO. : 4,876,602

DATED : October 24, 1989

INVENTOR(S) : ROBERT ZWIRN, et al.

It is certified that error appears in the above-identified patent and that said Letters Patent is hereby corrected as shown below:

Column 5, line 6, " Q' " instead of "Q,".

Signed and Sealed this

Twenty-eighth Day of January, 1992

Attest:

HARRY F. MANBECK, JR.

*Attesting Officer*       Commissioner of Patents and Trademarks